(12) United States Patent
Waichulis et al.

(10) Patent No.: US 10,233,959 B2
(45) Date of Patent: Mar. 19, 2019

(54) ANCHOR FOR ACCEPTING A SCREW OR FASTENER AND A METHOD OF USING THE SAME

(71) Applicants: Robert Waichulis, Itasca, IL (US); Michael Herdman, Itasca, IL (US); Aaron Sears, Itasca, IL (US)

(72) Inventors: Robert Waichulis, Itasca, IL (US); Michael Herdman, Itasca, IL (US); Aaron Sears, Itasca, IL (US)

(73) Assignee: SHAMROCK INTERNATIONAL FASTENER, LLC, Itasca, IL (US)

(*) Notice: Subject to any disclaimer, the term of this patent is extended or adjusted under 35 U.S.C. 154(b) by 164 days.

(21) Appl. No.: 15/297,527

(22) Filed: Oct. 19, 2016

(65) Prior Publication Data
US 2017/0108023 A1  Apr. 20, 2017

Related U.S. Application Data

(60) Provisional application No. 62/243,739, filed on Oct. 20, 2015.

(51) Int. Cl.
| | | |
|---|---|---|
| F16B 13/08 | (2006.01) | |
| F16L 3/137 | (2006.01) | |
| F16L 3/08 | (2006.01) | |
| F16B 37/04 | (2006.01) | |
| F16B 21/08 | (2006.01) | |
| F16B 33/00 | (2006.01) | |

(52) U.S. Cl.
CPC .......... *F16B 37/043* (2013.01); *F16B 21/086* (2013.01); *F16B 33/002* (2013.01)

(58) Field of Classification Search
CPC ..... F16B 37/043; F16B 21/086; F16B 33/002
See application file for complete search history.

(56) References Cited

U.S. PATENT DOCUMENTS

| | | | | |
|---|---|---|---|---|
| 3,802,476 A | * | 4/1974 | Hoadley | ............. F16B 37/02 411/82 |
| 8,690,273 B2 | * | 4/2014 | Dolinsek | ............. F25D 23/028 312/401 |
| 2008/0180013 A1 | * | 7/2008 | Lee | ............. F25D 23/064 312/406 |

* cited by examiner

*Primary Examiner* — John C Hong
(74) *Attorney, Agent, or Firm* — Justin Lampel

(57) ABSTRACT

An anchor for accepting a screw and a method of using the same is provided. In an embodiment, the anchor has a generally cylindrical hollow shaft secured to a generally concave circular spring-tensioned base unit. From the underside of the generally concave circular spring-tensioned base unit, the generally cylindrical hollow shaft receives a screw (applied from the opposing side of a wall or panel). The generally concave circular spring-tensioned base unit may be secured to the wall or panel in a predominately flush manner (along the rim) and may be used to prevent insulating foam from dislodging the anchor, which must remain in place during the foam process. In an embodiment, the device does not utilize adhesives or tape.

18 Claims, 9 Drawing Sheets

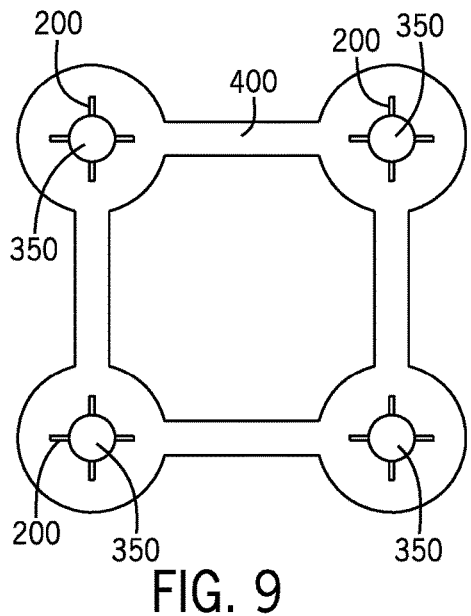
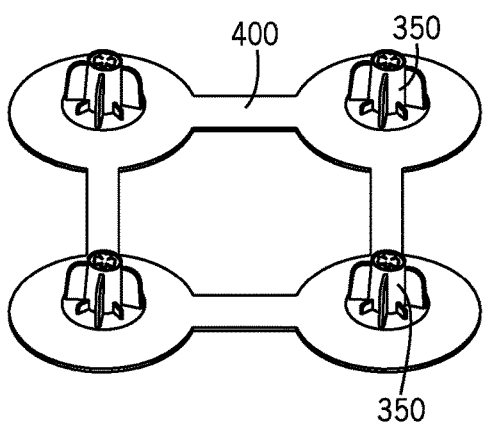
FIG. 9     FIG. 10
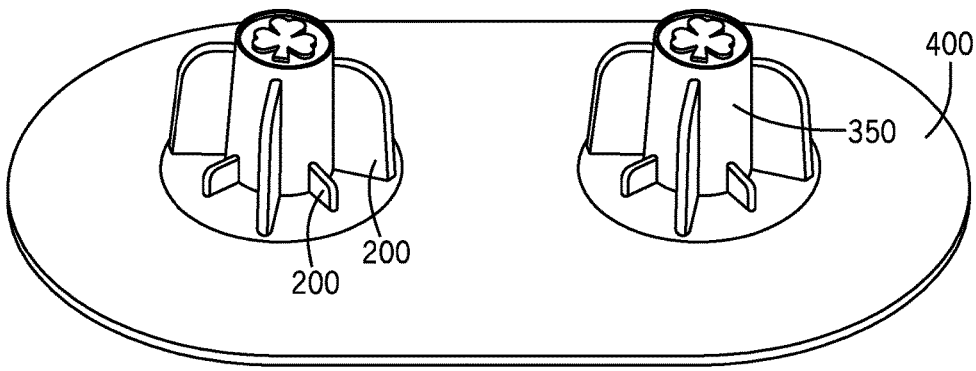
FIG. 11
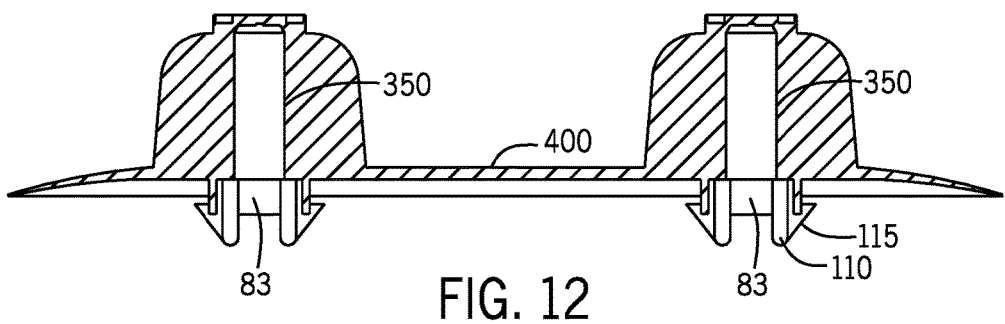
FIG. 12

ANCHOR FOR ACCEPTING A SCREW OR FASTENER AND A METHOD OF USING THE SAME

CROSS REFERENCE TO RELATED APPLICATION

The following application is based on and claims the priority benefit of U.S. Provisional Application Ser. No. 62/243,739 filed on Oct. 20, 2015; the entire contents of which are incorporated by reference.

BACKGROUND OF THE INVENTION

An anchor for accepting a screw and a method of using the same is provided. In an embodiment, the anchor has a generally cylindrical hollow shaft secured to a generally concave circular (or rectangular) spring-tensioned base unit. From the underside of the generally concave circular spring-tensioned base unit, the generally cylindrical hollow shaft receives a screw for mounting devices, accessories or other components (applied from the opposing side of a wall or panel). The generally concave circular spring-tensioned base unit may be secured to the wall or panel in a predominately flush manner (along the rim) and may be used to prevent insulating foam or the like from dislodging the anchor, which must remain in place during the foam process. In an embodiment, the device does not utilize adhesives or tape. Further, in an embodiment, at least one generally flat extension portion (or 'pin' in an alternative embodiment) extending upward from the generally concave circular spring-tensioned base unit prevents rotation of the anchor once the insulating foam is applied. The anchor is especially suitable for being secured to the wall or panel of a refrigerator or freezer before the refrigerator is foamed with insulation. Further, the present anchor for accepting a screw or fastener prevents foam from leaking into a cabinet (such as a refrigerator or freezer).

Providing anchoring devices for screws is known in the prior art. For example, U.S. Pat. No. 4,325,178 to Pruehs discloses a screw anchoring device and method for preassembled aperture sealing attachment with an apertured panel to confine insulating material foamed in place between the panel and a spaced wall. The screw anchoring device includes a flat portion having a central helical screw receiving impression with a retained knock-out central area capable of being displaced by a screw. The device is secured to the apertured panel with a screw receiving impression overlying the panel aperture. The screw anchor device has one or more wing portions formed integrally with the flat portion, said wing portions diverging from the plane of the flat portion in a direction away from the screw receiving impression and adapted to be imbedded in the foamed insulating material. In performing the method, a utility component is placed on the opposite side of the panel from the screw anchoring device overlying the panel aperture and a screw is passed first through the utility component then through the panel aperture and then through the screw anchoring device whereby the knock-out portion of the device is displaced and the screw is retained in the central helical screw receiving impression.

Further, U.S. Pat. No. 3,802,476 to Hoadley discloses a screw anchoring device for pre-assembled sealing attachment over an aperture in a wall surface panel, such as a plastic liner wall of a refrigerator, which, in turn, is to be attached to an outer cabinet wall with the space between the walls to be filled with an insulating material as, for example, a foamed in situ plastic material; the anchoring device including a plate portion with a helical screw impression and struck tabs piercing an attached double faced adhesive pad for mounting the device to the adjacent wall surface in position to seal the aperture therethrough with the screw impression in position to receive a screw passed through the adhesive pad for mounting various types of utility components to the accessible face of the liner wall, and the plate portion of the anchoring device having angled edge portion to facilitate initial handling and subsequent embedment in the foamed insulating material.

Further, U.S. Pat. No. 8,128,328 to Ginter discloses a fastening element for anchoring in a borehole with a hardenable compound has a shaft extending along a longitudinal axis, a mixing element, and a profiling element with radially protruding profiling sections.

However, the prior patents fail to describe an anchor (which will remain in place without adhesives or tape) for securing a screw which is easy to use and efficient as is described in the present application. Further, these patents fail to provide an anchor for accepting a screw or other fastener which is especially suitable for securing a devices, accessories or components to a wall of a refrigerator with a spring-tensioned concave base.

SUMMARY OF THE INVENTION

An anchor for accepting a screw and a method of using the same is provided. In an embodiment, the anchor has a generally cylindrical hollow shaft secured to a generally concave circular (or rectangular) spring-tensioned base unit. From the underside of the generally concave circular spring-tensioned base unit, the generally cylindrical hollow shaft receives a screw (applied from the opposing side of a wall or panel). The generally concave circular spring-tensioned base unit may be secured to the wall or panel in a predominately flush manner (along the rim) and may be used to prevent insulating foam from dislodging the anchor, which must remain in place during the foam process. In an embodiment, the device does not utilize adhesives or tape. Further, in an embodiment, at least one generally flat extension portion (or 'pin' in an alternative embodiment) extending upward from the generally concave circular spring-tensioned base unit prevents rotation of the anchor once the insulating foam is applied. The anchor is especially suitable for securing a screw to the wall or panel of a refrigerator or freezer before the refrigerator is foamed with insulation. Further, the present anchor for securing a screw prevents foam from leaking into a cabinet (such as a refrigerator or freezer).

An advantage of the present anchor for securing a screw is that the present anchor for securing a screw is easy to use by holding the anchor and allowing a user to locate a mating opening.

And an advantage of the present anchor for securing a screw is that the present anchor for securing a screw prevents foam from leaking into a cabinet (such as a refrigerator or freezer).

Still another advantage of the present anchor for securing a screw is that the present anchor for securing a screw may have perpendicularly extending shafts of a variety of shapes, including but not limited to pyramids, rectangles, squares, or cylinders which prevent the rotation of the anchor.

Yet another advantage of the present anchor for securing a screw is that the present anchor for securing a screw has a generally concave spring-tensioned base unit which helps secure the anchor to a wall or panel of, for example, a refrigerator or freezer in a flush manner through a spring like action of flexing plastic.

And an advantage of the present anchor for securing a screw is that the present anchor for securing a screw, in an embodiment, may be constructed of a durable plastic.

Still another an advantage of the present anchor for securing a screw is that the present anchor for securing a screw may slightly bend or contort to snap into (and ultimately be secured) within an opening of the wall or panel when pushed into the opening and may automatically snap back to its original shape so as to better hold the anchor in the wall or panel of the refrigerator or freezer.

Yet another advantage of the present anchor for securing a screw is that the present anchor for securing a screw may have, for example, a diamond-shaped or wedged-shaped finger grip which helps with inhibiting the rotation of the anchor within insulating foam once the insulating foam is applied around the anchor.

And an advantage of the present anchor for securing a screw is that the present anchor may have a wide-angled support which helps deflect foam during the foaming stage and further helps provide better support when driving the screw into the anchor.

Yet another advantage of the present anchor for securing a screw is that the present anchor may have a flexible seal around the edge of the anchor which helps the anchor seal in installation and further helps keep the foam from leaking under the edge of the anchor and dislodging the anchor which might therein allow foam to leak into the cabinet of the refrigerator or freezer through the screw hole.

Another advantage of the present anchor for securing a screw is that the present device provides more thread engagement while turning which may result in a higher strip torque, pull out force and better resistance to loosening over time Another advantage for the present anchor is that the present device allows for a secure attachment to a mating panel without an additional adhesive or tape For a more complete understanding of the above listed features and advantages of the present anchor for securing a screw reference should be made to the detailed description and the drawings. Further, additional features and advantages of the invention are described in, and will be apparent from, the detailed description of the preferred embodiments.

BRIEF DESCRIPTION OF THE DRAWINGS

FIG. 9 illustrates a top view of the device in one embodiment wherein multiple anchors are connected to a single base.

FIG. 10 illustrates a top perspective view of the device in one embodiment wherein multiple anchors are connected to a single base.

FIG. 11 illustrates a top perspective view of the device in an alternative embodiment wherein two anchors are secured to a base.

FIG. 12 illustrates a cross sectional view of the device of FIG. 11.

DETAILED DESCRIPTION OF THE PREFERRED EMBODIMENTS

An anchor for accepting a screw and a method of using the same is provided. In an embodiment, the anchor has a generally cylindrical hollow shaft secured to a generally concave circular (or rectangular) spring-tensioned base unit. From the underside of the generally concave circular spring-tensioned base unit, the generally cylindrical hollow shaft receives a screw (applied from the opposing side of a wall or panel). The generally concave circular spring-tensioned base unit may be secured to the wall or panel in a predominately flush manner (along the rim) and may be used to prevent insulating foam from dislodging the anchor, which must remain in place during the foam process. In an embodiment, the device does not utilize adhesives or tape. Further, in an embodiment, at least one generally flat extension portion (or 'pin' in an alternative embodiment) extending upward from the generally concave circular spring-tensioned base unit prevents rotation of the anchor once the insulating foam is applied. The anchor is especially suitable for securing a screw to the wall or panel of a refrigerator or freezer before the refrigerator is foamed with insulation. Further, the present anchor for securing a screw prevents foam from leaking into a cabinet (such as a refrigerator or freezer).

Figure 1:
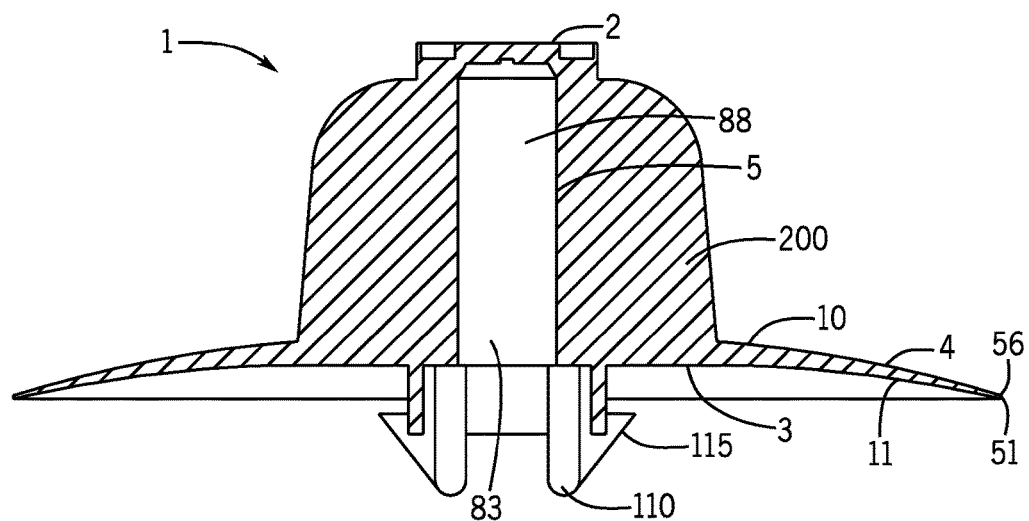
FIG. 1 illustrates a cross sectional view of a first embodiment of an anchor for accepting a screw or other fastener.
Figure 7:
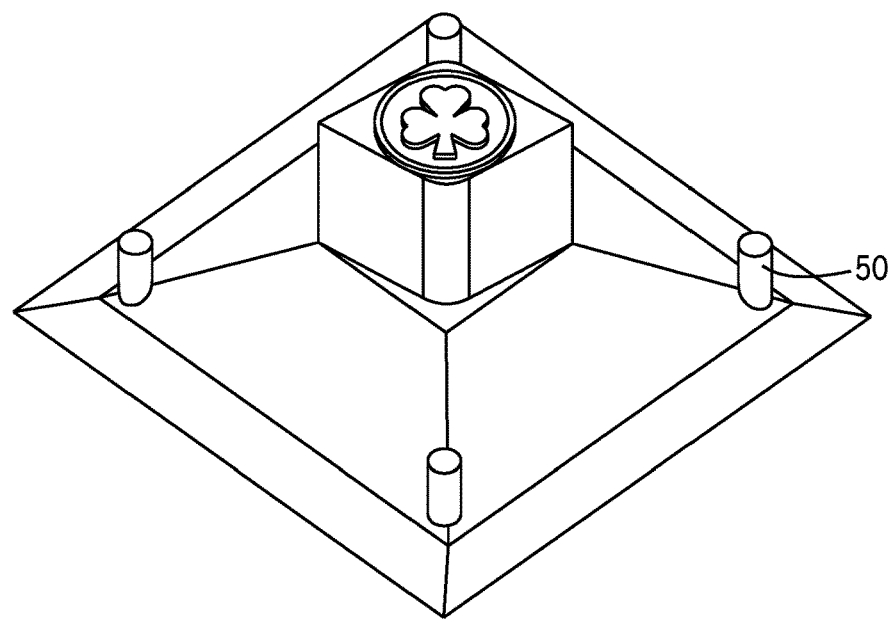
FIG. 7 illustrates a top perspective view of the device in an embodiment.
Figure 8:
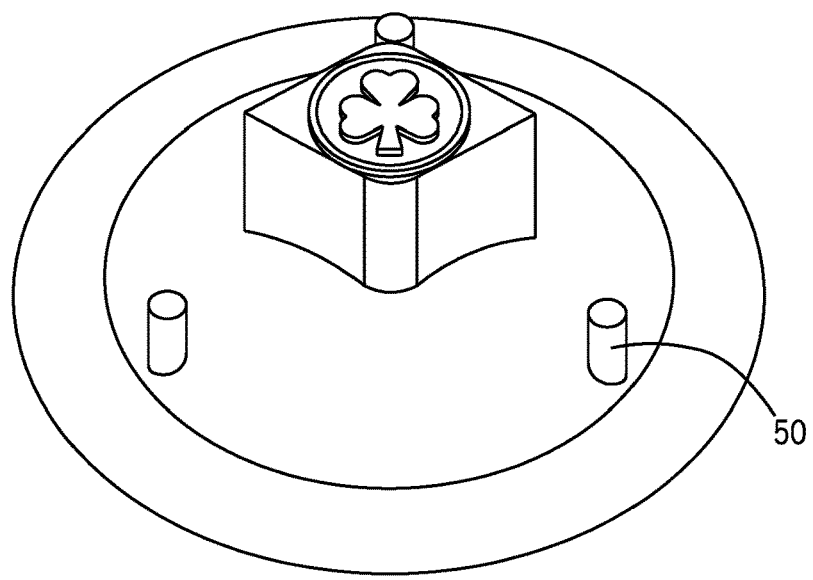
FIG. 8 illustrates a top perspective view of the device in an embodiment.

Referring first to FIG. 1, in a first embodiment an anchor 1 for securing a screw 84 (FIG. 16) is provided. The anchor 1 may have a top 2, a bottom 3, a generally circular concave spring-tensioned base unit 4 and a main shaft 5. In an embodiment, the generally circular concave spring-tensioned base unit 4 may have a top surface 10 and a bottom surface 11 wherein the top surface 10, in one embodiment, may slant downward in a non-parallel orientation with respect to the surface the device 1 is secured to (as described below). Although the anchor 1 is preferable made from a durable plastic, alternative materials may be used to construct the anchor 1 depending on the desired application. Further, although most of the figures illustrate the spring-tensioned base unit 4 as generally circular, alternative shapes may be utilized (for example, FIG. 7 illustrates a square-shaped base unit 4).

Figure 16:
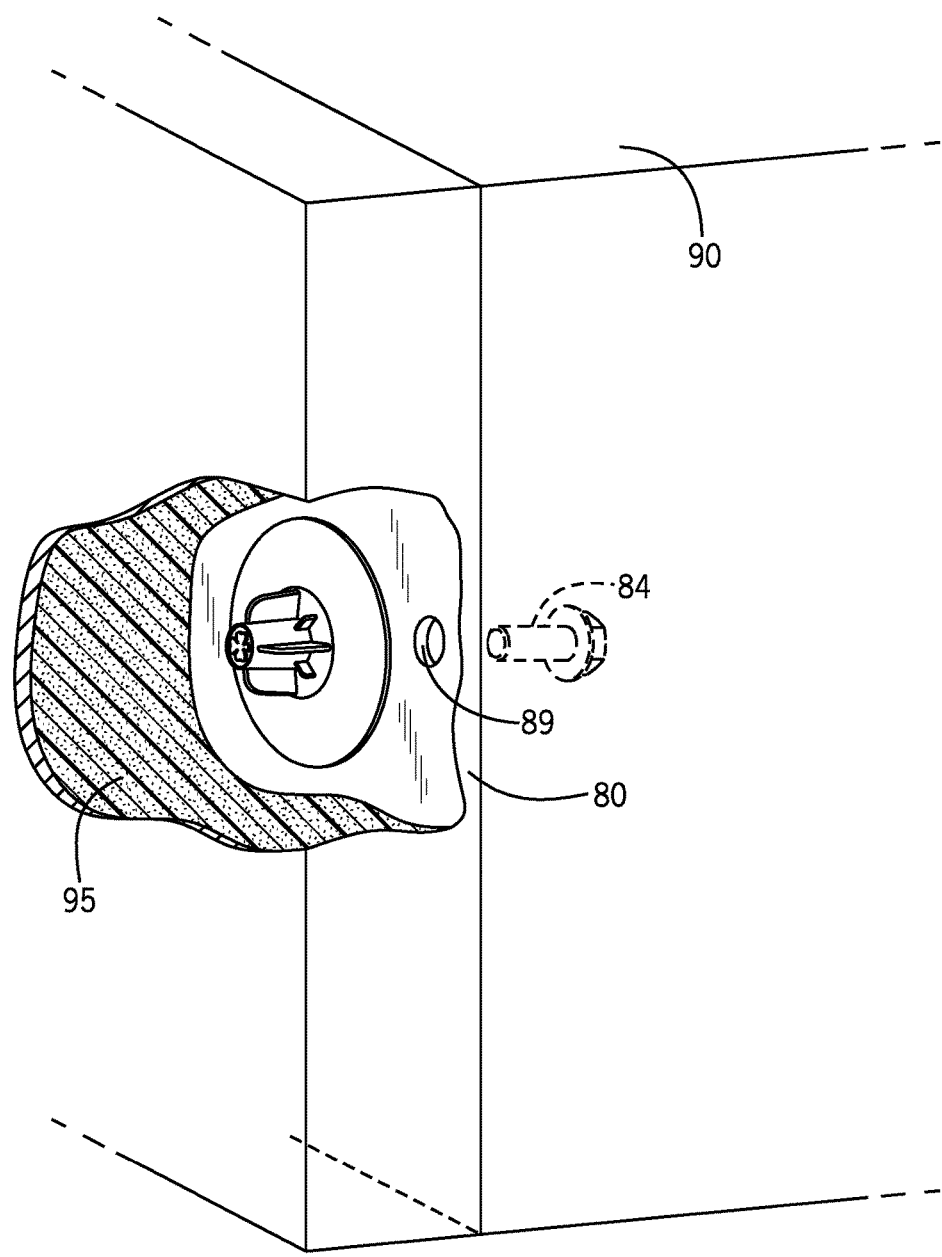
FIG. 16 illustrates a view of the anchor secured to a wall or panel.
Figure 17:
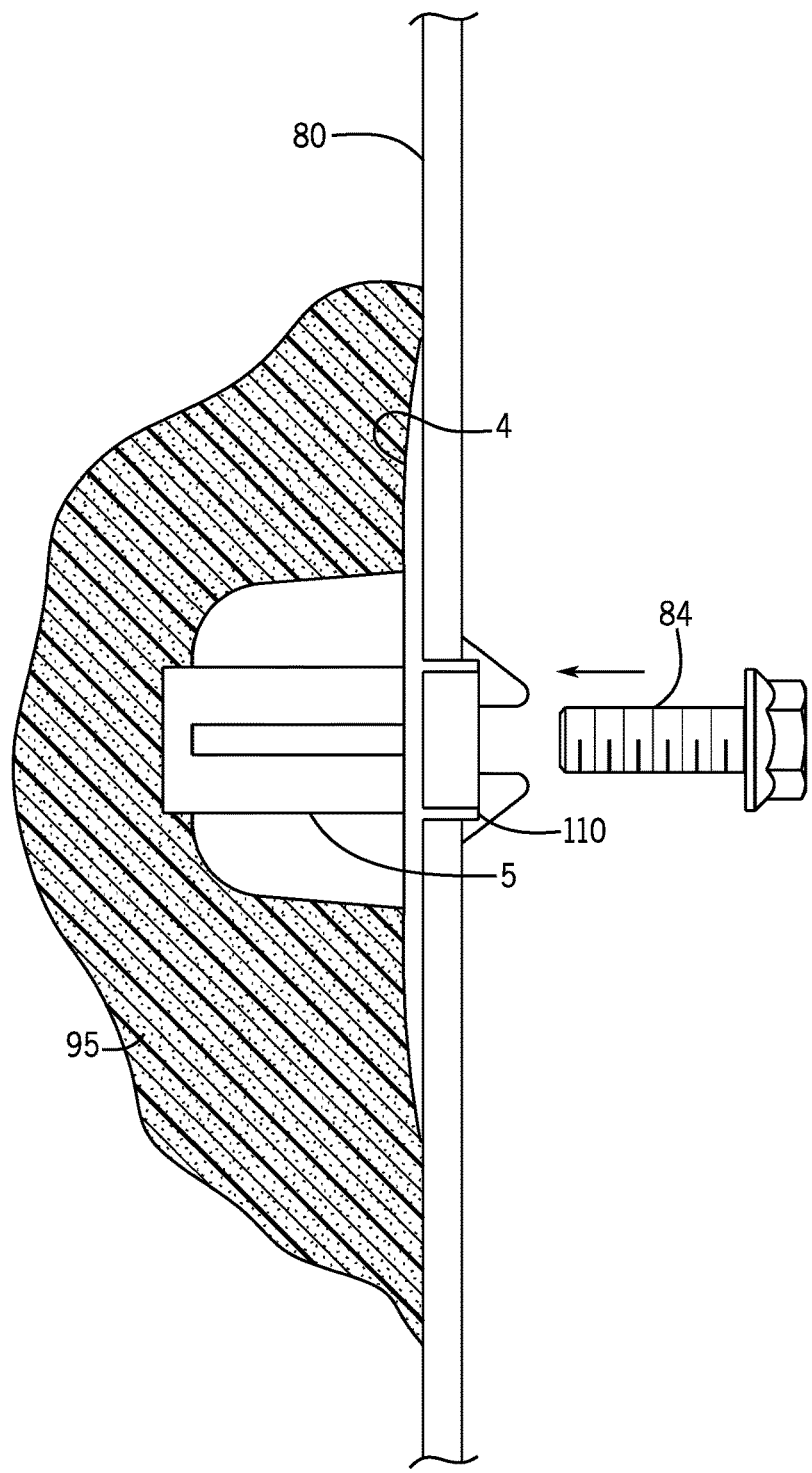
FIG. 17 illustrates a side view of a screw being inserted into the anchor which is already in place on the wall or panel.

During use, the device 1 may be secured within, for example, a refrigerator or freezer 90 (FIG. 16). In particular, the device 1 may allow the screw 84 to accept and/or secure a first panel of a refrigerator or freezer 90 to a second panel of a refrigerator or freezer 90 or may be used to secure a shelf, device, component or the like of the refrigerator or freezer 90. It should be understood that the anchor 1 may be used on objects other than a refrigerator or freezer 90. To use the device, the bottom 11 of the spring-tensioned base unit 4 of the device 1 is first placed behind a wall or panel 80 (wherein the wall or panel 80 has an opening 89 as in FIG. 16) in the refrigerator or freezer 90 and then snapped into place in the opening 89 utilizing an extended rim 115 (FIG. 3) of the bottom 3 of the device 1. Foam or the like 95 (FIG. 17) is then inserted between the walls or panels 80 of the cabinet and therein completely surrounds the anchor 1. Once the foam or the like 95 is secured around the anchor 1, a screw 84 is then screwed through the opening 89 and catches the device 1 on the other side of the wall or panel 80. The concave shape of the spring-tensioned base unit 4, when pulled by the screw 84 and toward the wall or panel 80, may create the spring tension to partially secure the device 1 in place.

The device 1 is especially suitable when used in connection with insulating foam 95 (FIG. 17) of a refrigerator or freezer 90. Further, the nature of the device (as described below) prevents the device 1 from rotating when the insulating foam 95 is applied and surrounds the anchor 1 during construction of the refrigerator or freezer 90. In an alternative embodiment, the bottom 11 of the spring-tensioned base unit 4 may have an adhesive 150 (FIG. 3) which further aids in securing the device 1 to the wall or panel 80 of the refrigerator or freezer 90. It should be understood that the device 1 may be utilized without the adhesive 150, such as is illustrated in FIG. 1.

In an embodiment a perimeter 51 (FIG. 1) of the spring-tensioned base unit 4 may have a tapered edge 56. In particular, the tapered edge 56 may prevent the insulating foam or the like 95 (applied during construction) to gain access to the under-surface of the bottom 11 of the spring-tensioned base unit 4. In an embodiment, the bottom 11 of the generally circular concave spring-tensioned base unit 4 may have an opening 83 (FIG. 1). The opening 83 may receive the screw 84 (FIG. 16) applied from the opposing side of the wall or panel 80 which may ultimately be secured within a generally hollow interior 88 of the main shaft 5 as described above.

Figure 3:
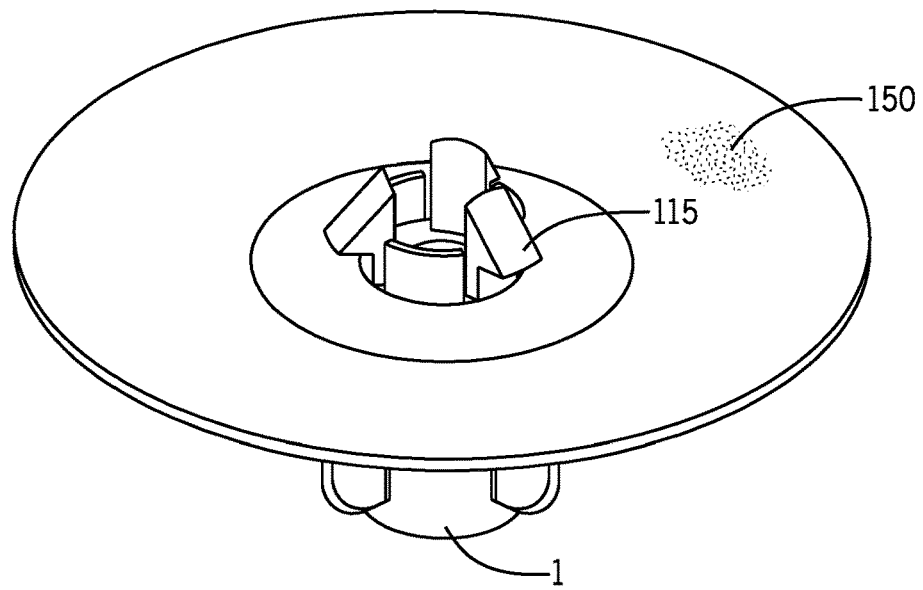
FIG. 3 illustrates a bottom view of the device.

In an alternative embodiment, the bottom 11 of the spring-tensioned base unit 4 may have a generally cylindrical protrusion 110 (FIG. 1) or straight snap protrusion as shown in FIG. 3 which allows the device 1 to snap into the opening 89 of the panel or wall 80 of the refrigerator or freezer 90. In particular, the generally cylindrical protrusion 110 may have an extended rim 115 which provides the generally cylindrical protrusion 110 with a slightly greater diameter than the diameter of the opening 89 of the wall or panel 80 of the refrigerator or freezer 90. As force is applied by the installing person, the extended rim 115 slightly contorts inward so as to fit into the opening 89 of the panel or wall 80 and then snaps back to its original shape therein securing the device 1 to the panel or wall 80.

Figure 4:
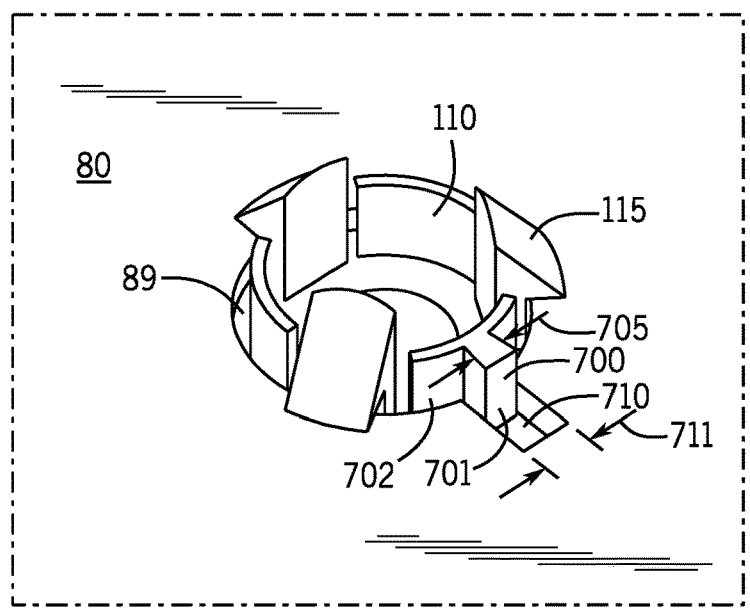
FIG. 4 illustrates a view of the bottom of the anchor secured into an opening of a wall or panel of a refrigerator or freezer wherein the device has an anti-rotation unit.

Referring now to FIG. 4, in an alternative embodiment, the device 1 may have an anti-rotation unit 700 located on the bottom 3 of the device 1. In particular, the anti-rotation unit 700 may have a generally square-shaped base portion 701 and a generally curved thin portion 702 attached to the generally square-shaped base portion 701. The generally square-shaped base portion 701 may snugly fit into a receiving slot 710 connected to the opening 89 of the wall or panel 80. The anti-rotation unit 700 may prevent the device 1 from rotating once inserted into the opening 89. In use, the generally curved thin portion 702 remains within the opening 89 while the generally rectangular-shaped base portion 701 locks into the receiving slot 710. More specifically, the generally square-shaped base portion 701 may have a width 705 which is slightly less than the width 711 of the receiving slot 710 so as to allow the device 1 to lock into the opening 89 of the wall or panel 80 and remain stationary.

Figure 5:
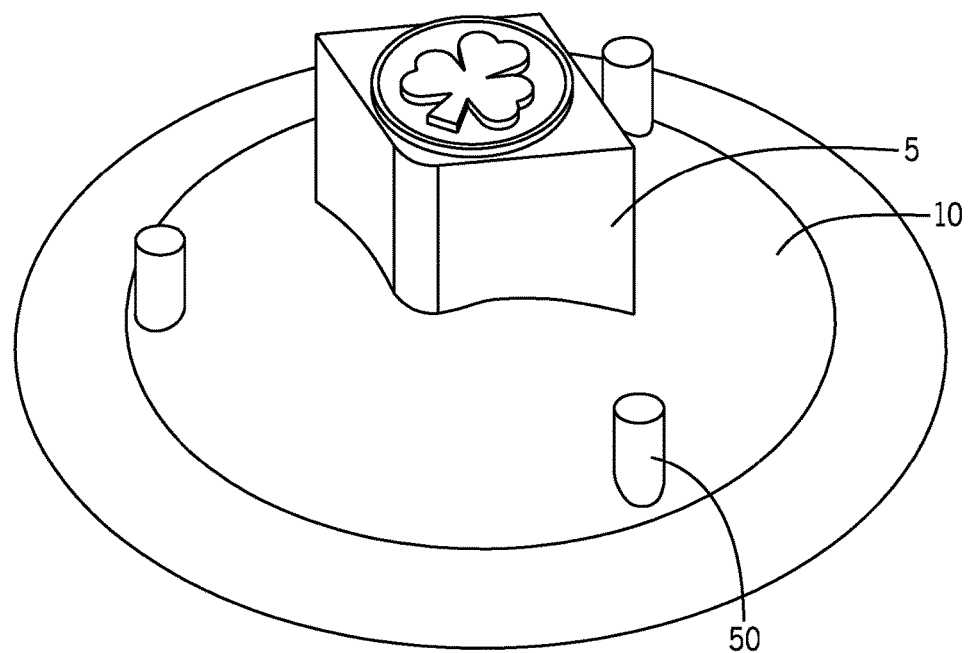
FIG. 5 illustrates a close up perspective view of the device in an embodiment.
Figure 6:
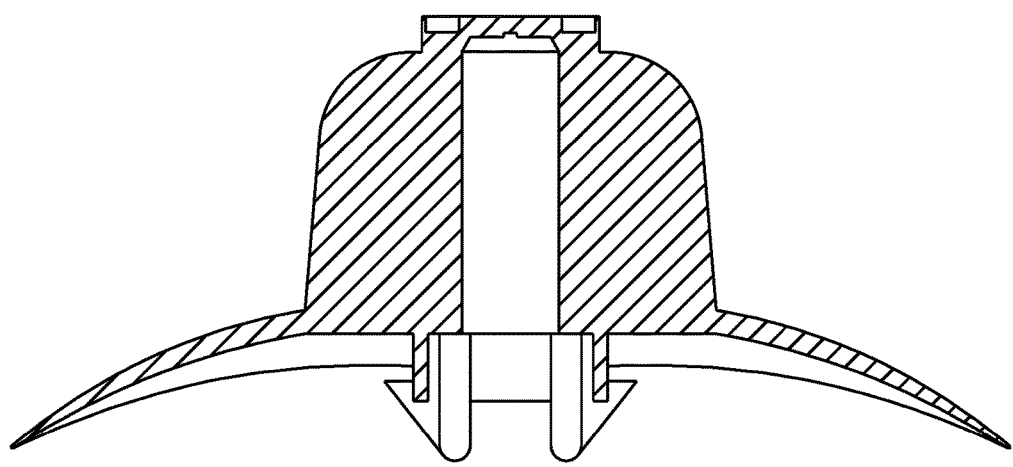
FIG. 6 illustrates a cross section view of the device in an embodiment.

Referring now to FIG. 5, in a second (or "diamond") embodiment, the main shaft 5 of the anchor 1 may be generally square or diamond-shaped. Extending upward from the top 10 of the base unit 4 may be a plurality of perpendicularly extending pins (or 'shafts') 50. Although the figures illustrates the perpendicularly extending pins 50 as cylindrical; the perpendicularly extending pins 50 may be pyramids, rectangles, squares, cylinders or other suitable shapes. In an embodiment, the perpendicular extending pins 50 may extend upward from the base unit 4 near the perimeter of the base unit 4. The perpendicular extending pins 50 may prevent the anchor 1 from rotating once insulating foam or the like 95 is applied to and surrounds the anchor 1 during construction of the refrigerator or freezer 90.

Figure 2:
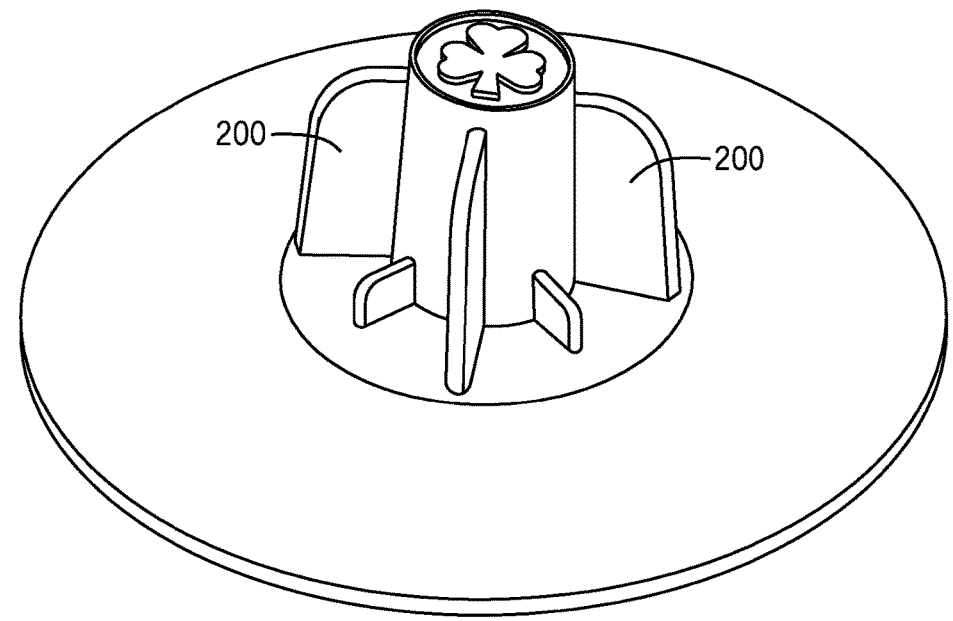
FIG. 2 illustrates a perspective side view of the device.

Referring again to FIGS. 1 and 2, in an embodiment, the main shaft 5 may have a generally cylindrical interior 88 while the exterior of the main shaft 5 has at least one extended "wing" section 200. (FIGS. 1 and 2 illustrate a device having four larger winged sections and four smaller winged sections). The extended wing section 200 may allow a user to easily manually grasp the device 1 during insertion of the device 1 into the wall or panel (as described below). In addition, the wing sections 200 may act similar to the extending pins 50 in that the wing sections 200 may restrict the rotational movement of the device 1 when the insulating foam 95 is inserted around the device 1 and hardens. More specifically, the wing section 200 may become embedded into the insulating foam 95 once the insulating foam 95 hardens. Once embedded, the device 1 becomes more stable and less prone to movement.

Figure 18:
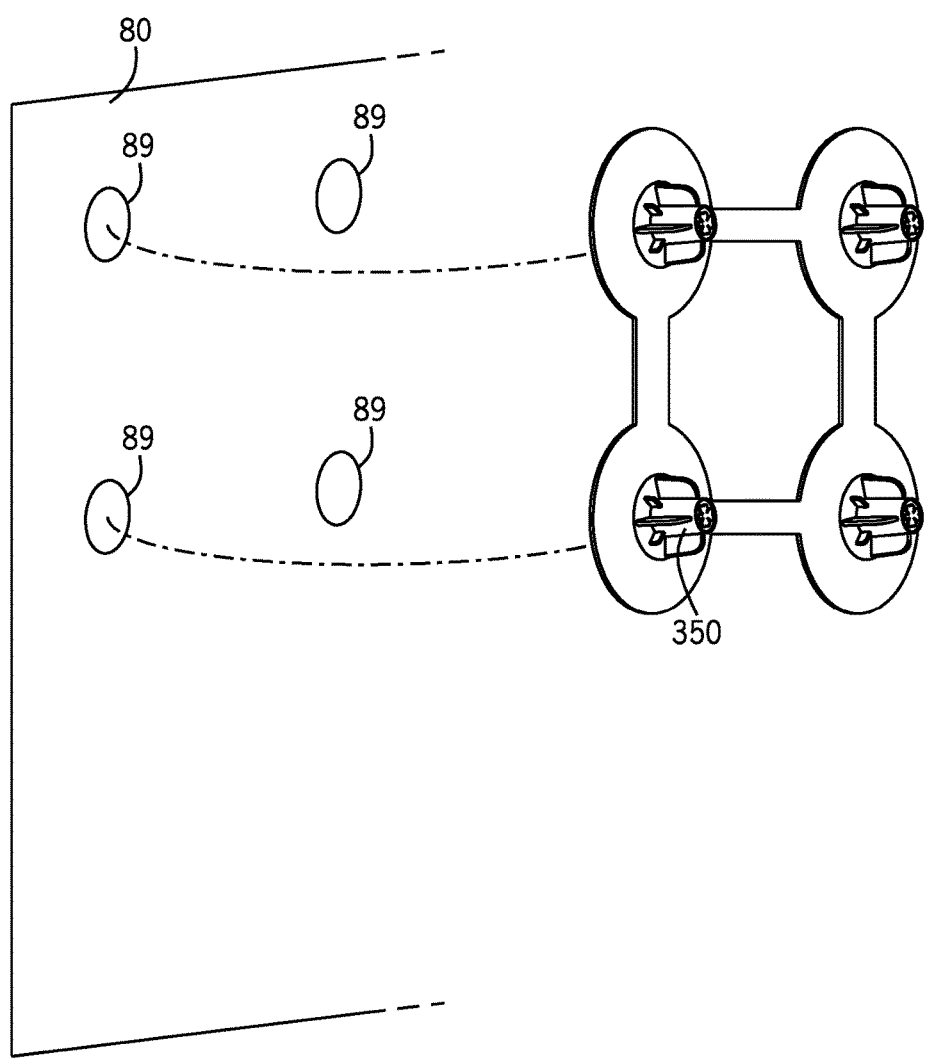
FIG. 18 illustrates a view of the multiple anchor embodiment being secured into multiple openings of a wall or panel.

Referring now to FIGS. 9-12, in an alternative embodiment, the device 1 may utilize multiple main shafts 350 on a single base unit 400. In particular, FIGS. 9 and 10 illustrate a single base unit 400 having four multiple main shafts 350. In this embodiment, four holes 89 (FIG. 18) would be filled in by four screws 84 which enter the four openings 83 of the bottom of the single base unit 400. The multiple main shafts 350 utilized for a single base unit 400 not only saves production time in securing a wall or panel of a refrigerator or freezer 90, but the multiple main shafts 350 also eliminates the possibility of any one unit (as is illustrated in FIG. 1) accidentally rotating during the foaming process. FIGS. 11-12 illustrate a two main shaft 350 version which operates in the same manner as the four main shaft unit of FIGS. 9 and 10. It should be understood that any number of main shaft units may be unitized on a single base unit 400.

Figure 13:
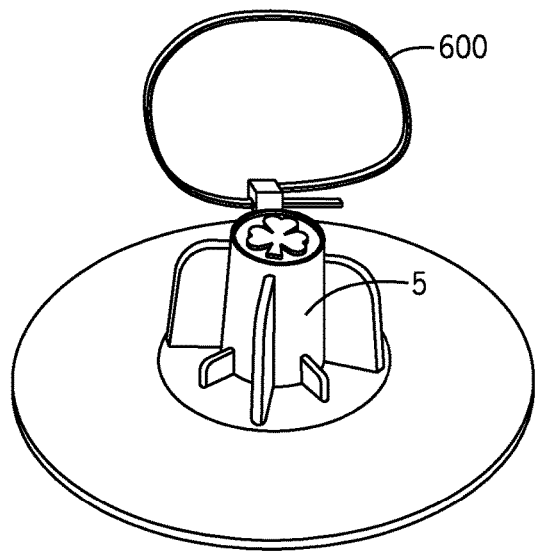
FIG. 13 illustrates a top perspective view of the device wherein a tie is utilized and wherein the tie is in the first position.
Figure 14:
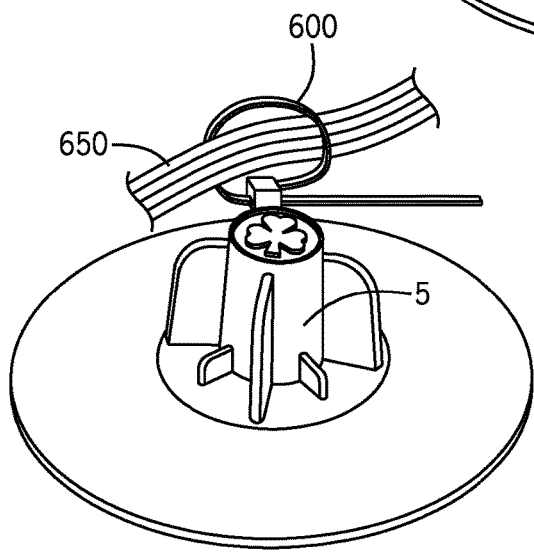
FIG. 14 illustrates a top perspective view of the device wherein a tie is utilized and wherein the tie is in the second position.
Figure 15:
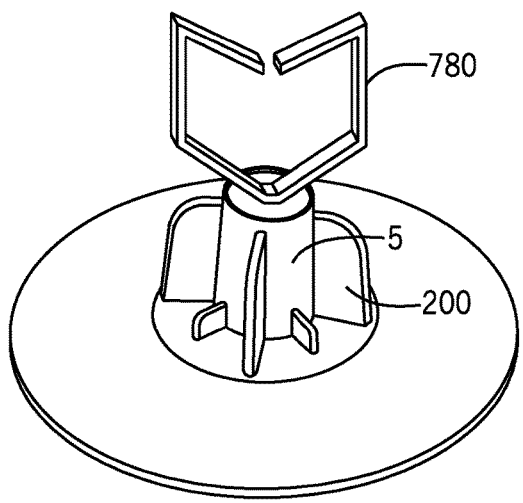
FIG. 15 illustrates a top perspective view of the device utilizing an alternative tie.

Referring now to FIGS. 13 to 15, in an embodiment, the top of the main shaft 5 may have a securing mechanism 600. More specifically, the securing mechanism 600 may be similar to, for example, a pull tie. The securing mechanism 600 may be used to secure a wire or bundle of wires 650 which may utilized within the object (such as a refrigerator) the device 1 is inserted into. For example, the securing mechanism 600 may be utilized at the top 2 of the device 1 and may allow a user to secure, for example, electrical wires 650 in a specific location while at the same time securing a panel or wall of the refrigerator or allowing a shelf to be inserted in the refrigerator. The securing of the wires 650 may speed up the production of the object and may prevent accidentally piercing a wire 650 during construction. FIG. 15 illustrates an alternative securing mechanism 780 to the pull tie 600 of FIGS. 13 and 14. In the securing mechanism 780 of FIG. 15, the bundle of wires 650 may be snapped into the securing mechanism 780. It should be understood that the securing mechanism 600 may also be located on the top of the shafts 5 of the multi-shaft embodiments (FIGS. 9-12) in addition to the single shaft 5 embodiments of FIGS. 13 to 15.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:
1. An anchor for accepting a screw comprising:
   a top and a bottom forming a base;
   a main shaft extending perpendicularly with respect to the base and extending above the top of the base wherein the main shaft has a sealed top;
   a generally flat extended wing section wherein the generally flat extended wing section has a top, a bottom, a first side and a second side and wherein the bottom of the generally flat wing section is secured to the top of the base and extends above the top of the base and wherein the first side of the generally flat wing section is secured to a side of the main shaft and wherein the second side of the generally flat wing section is not secured to the main shaft;
   an opening on the bottom of the base wherein the opening leads to a generally hollow interior cavity within the main shaft and wherein the generally hollow cavity of the shaft is capable of accepting a screw.
2. The anchor for accepting a screw of claim 1 wherein the base is circular.
3. The anchor for accepting a screw of claim 1 wherein the independent perpendicularly extending shaft is capable of preventing the rotation of the anchor when the anchor is surrounded by an insulation foam and wherein the independent perpendicularly extending shaft lacks a hollow interior cavity.
4. The anchor for accepting a screw of claim 1 further comprising:
   a securing mechanism attached to a top of the main shaft wherein the securing mechanism is capable of receiving and securing a cable or wire.
5. The anchor for accepting a screw of claim 1 further comprising:
   a generally cylindrical extended protrusion extending perpendicularly with respect to a bottom of the base wherein the generally cylindrical extended protrusion has an extended rim portion which is capable of grasping and securing the anchor to an opening.
6. The anchor for accepting a screw of claim 1 wherein the main shaft is not cylindrical.
7. The anchor for accepting a screw of claim 1 wherein the base is flexible and is arched and has a spring tension.
8. The anchor for accepting a screw of claim 1 further comprising:
   a securing mechanism attached to the sealed top of the main shaft wherein the securing mechanism is capable of securing an object.
9. The anchor for accepting a screw of claim 8 wherein the securing mechanism has a diameter which is adjustable.
10. A method of anchoring a screw to an opening in a wall or panel comprising:
   providing a wall or a panel wherein the wall or the panel has an opening;
   providing a securing anchor having a top and a bottom of a base; a main shaft extending perpendicularly with respect to the base; an opening on the bottom of the base wherein the opening leads to a generally hollow interior cavity within the main shaft and wherein the generally hollow cavity of the shaft is capable of accepting a screw;
   a generally flat extended wing section wherein the generally flat extended wing section has a top, a bottom, a first side and a second side and wherein the bottom of the generally flat wing section is secured to the top of the base and extends above the base and wherein the first side of the generally flat wing section is secured to a side of the main shaft and wherein the second side of the generally flat wing section is not secured to the main shaft;
   aligning the opening of the bottom of the base with the opening of the wall or panel;
   applying foam insulation which completely surrounds the securing anchor; and
   inserting a screw into the opening of the bottom of the securing anchor wherein the screw passes through the opening in the wall or the panel.
11. The method of anchoring a screw to an opening in a wall or a panel of claim 10, further comprising the steps of:
   providing a circular base of the securing anchor.
12. The method of anchoring a screw to an opening in a wall or a panel of claim 10, further comprising the steps of:
   providing at least an independent perpendicularly extending shaft unattached to the main shaft wherein the independent perpendicularly extending shaft extends from the base of the securing anchor wherein the independent perpendicularly extending shaft is capable of preventing the rotation of the securing anchor when the securing anchor is surrounded by the foam insulation and wherein the independent perpendicularly extending shaft lacks a hollow interior cavity.
13. The method of anchoring a screw to an opening in a wall or a panel of claim 10, further comprising the steps of:
   providing at least one extended wing portion extending from the main shaft and connected to both the main shaft and the base.
14. The method of anchoring a screw to an opening in a wall or a panel of claim 10, further comprising the steps of:
   providing a securing mechanism attached to a top of the main shaft wherein the securing mechanism is capable of receiving and securing a cable or wire.
15. The method of anchoring a screw to an opening in a wall or a panel of claim 14 wherein the securing mechanism has a loop capable of securing an object and wherein the size of the loop is adjustable.
16. The method of anchoring a screw to an opening in a wall or a panel of claim 10, further comprising the steps of:
   providing a generally cylindrical extended protrusion extending perpendicularly with respect to a bottom of the base wherein the generally cylindrical extended protrusion has an extended rim portion which is capable of grasping and securing the anchor to an opening.

17. The method of anchoring a screw to an opening in a wall or a panel of claim 10 wherein the base of the securing anchor is flexible and is arched and has a spring tension.

18. An anchor for accepting a screw comprising:
- a top and a bottom forming a base;
- a main shaft extending perpendicularly with respect to the base and extending above the top of the base wherein the main shaft has a sealed top;
- an independent perpendicularly extending shaft unattached to the main shaft wherein the independent perpendicularly extending shaft extends above the top of the base; and
- an opening on the bottom of the base wherein the opening leads to a generally hollow interior cavity within the main shaft and wherein the generally hollow cavity of the shaft is capable of accepting a screw.

\* \* \* \* \*